May 12, 1936.  R. C. WILLIAMS  2,040,418
INTERNAL COMBUSTION ENGINE
Filed March 20, 1931  5 Sheets-Sheet 1

INVENTOR
Ralph C. Williams
BY his ATTORNEYS
Cooper, Kerr & Dunham

May 12, 1936.   R. C. WILLIAMS   2,040,418
INTERNAL COMBUSTION ENGINE
Filed March 20, 1931   5 Sheets-Sheet 2

INVENTOR
Ralph C. Williams
BY his ATTORNEYS

May 12, 1936.  R. C. WILLIAMS  2,040,418
INTERNAL COMBUSTION ENGINE
Filed March 20, 1931   5 Sheets-Sheet 3
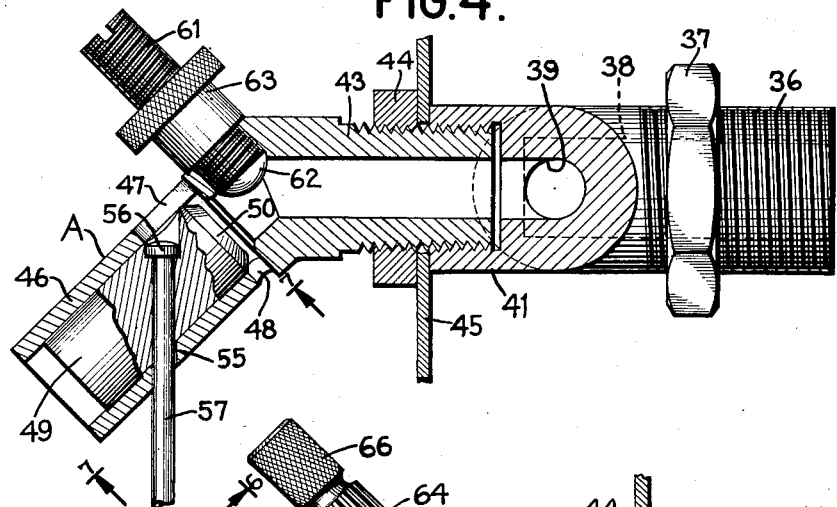
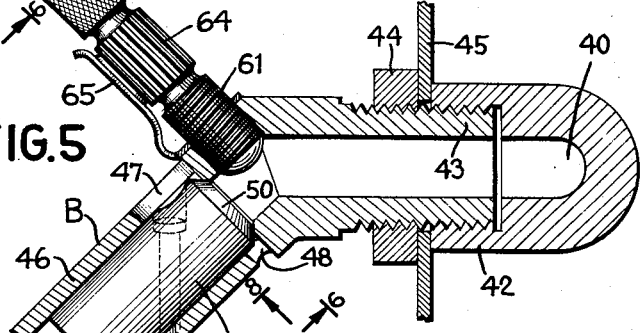
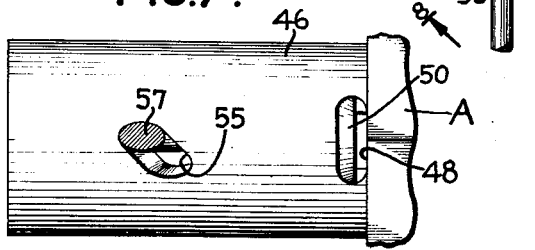
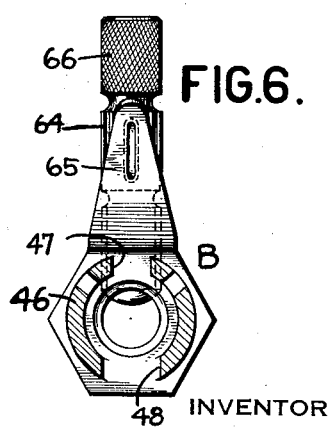
INVENTOR
Ralph C. Williams
BY his ATTORNEYS
Cooper, Kerr & Dunham

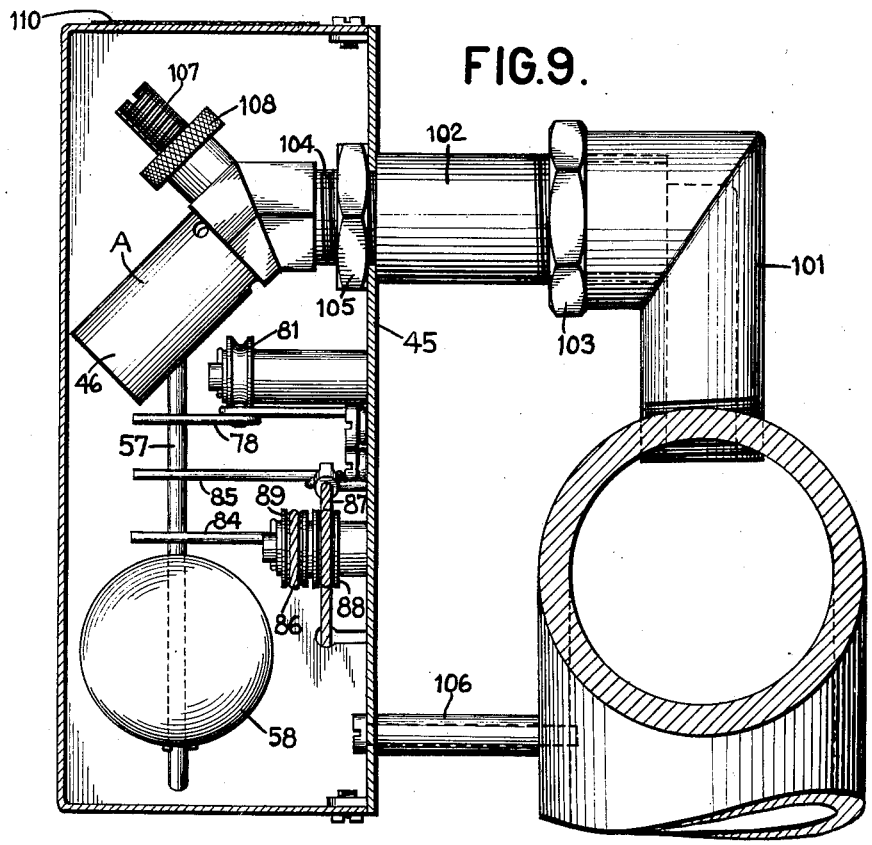
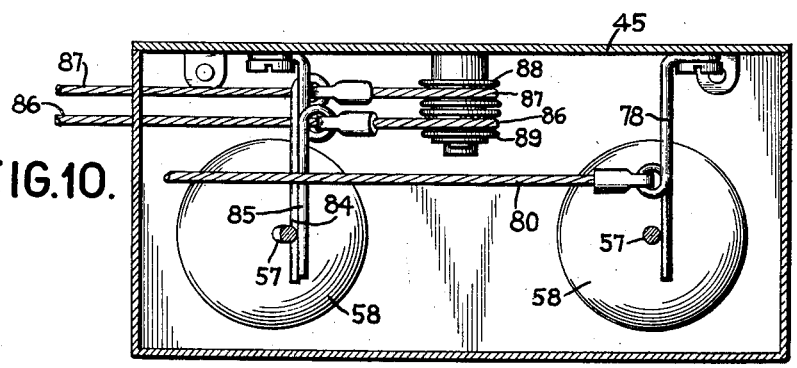

May 12, 1936.  R. C. WILLIAMS  2,040,418
INTERNAL COMBUSTION ENGINE
Filed March 20, 1931  5 Sheets-Sheet 5
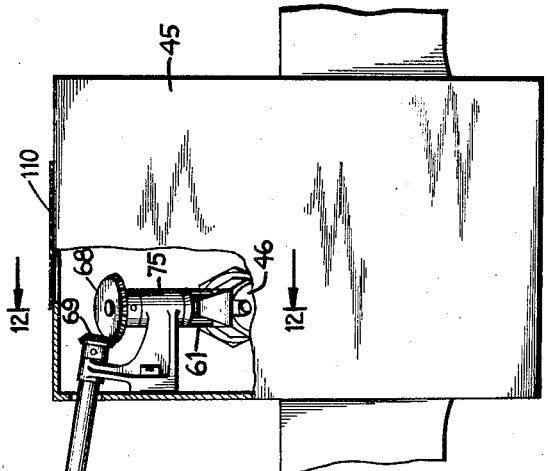
FIG.11.
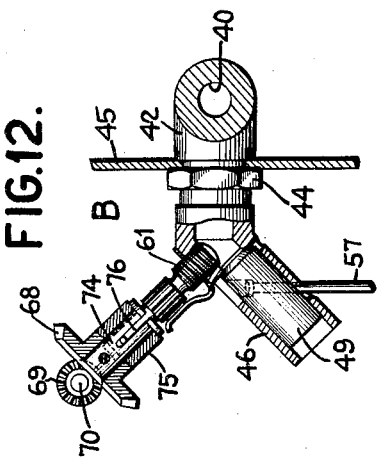
FIG.12.
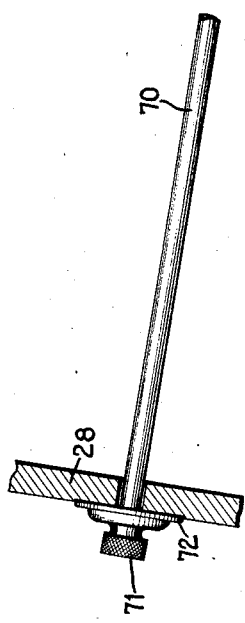
INVENTOR
Ralph C. Williams
BY his ATTORNEYS
Cooper, Kerr & Dunham Patented May 12, 1936

2,040,418

UNITED STATES PATENT OFFICE 2,040,418

INTERNAL COMBUSTION ENGINE

Ralph C. Williams, Brooklyn, N. Y.

Application March 20, 1931, Serial No. 524,029

23 Claims. (Cl. 180—77)

This invention relates generally to internal combustion engines and has particular reference to improvements in devices for controlling a part of the air supply for the engine.

One object of the invention is to provide air control devices which will increase the efficiency and economy of operation of an internal combustion engine and which will nevertheless not interfere with any possible demands upon the engine when starting or when the full force of the draft created by the engine should be employed in drawing fuel from the carburetor or other source of supply.

Another object is to provide air control devices having the characteristics stated which can be controlled by a vehicle operator from the operator's seat, in connection with devices which will reduce or shut off the air supply automatically when an increased draft of fuel from the source of supply is needed, as, for instance, when climbing a hill.

Other and more or less incidental objects are to provide a construction which will lessen fuel consumption, oil consumption and oil dilution; and which will reduce the amount of carbon monoxide in the exhaust. The fouling and formation of carbon in the motor is reduced, and danger resulting from back-fire lessened because of the fact that one or more exits are provided between the engine and the carburetor.

In the following description and in the accompanying drawings various features of the invention are shown as they would appear in an automobile having a choke, a throttle and a standard gear shift. As will be apparent later on, however, the inventions can be employed in whole or in part, with possibly some modifications in the shapes and relative arrangements of the parts, in airplanes and vehicles having other types of engine and speed controls. It is to be understood, therefore, that the invention consists in a novel construction and combination of parts, the main features of which are pointed out in appended claims and that the embodiments hereinafter described and shown in the drawings are illustrative only.

Figure 2:
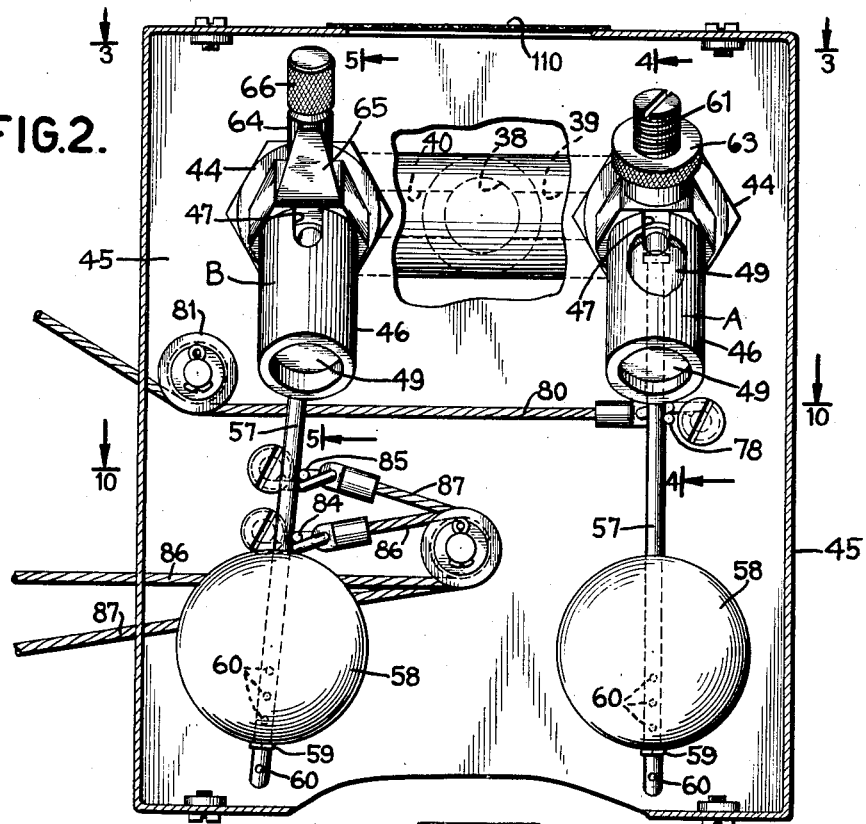
Fig. 2 is a right side view of the auxiliary air inlet valve mechanism and some of the controls for the valves.

Fig. 4 is a section along the line 4—4 of Fig. 2.
Fig. 5 is a section along the line 5—5 of Fig. 2.
Fig. 6 is a section on the line 6—6 of Fig. 5.
Fig. 7 is a view along the line 7—7 of Fig. 4 of one of the valves, and Fig. 8 is a corresponding view of the other valve.

Fig. 9 is a right end view of one of the valve mechanisms in which all of the functions are combined in one valve and a control mechanism for that valve. Except for this difference the view is substantially the same as one along the line 9—9 of Fig. 1.

Fig. 10 is a view along the line 10—10 of Fig. 2.

Fig. 11 shows mechanism comprising a button or knob on the instrument board of an automobile for regulating the flow of air through one of the intake valves independently of the controls which are connected with the starting and speed or engine control devices.

Fig. 12 is a section on the line 12—12 of Fig. 11.

As stated above, the various parts of the improvement are shown in the accompanying drawings in the form they would have when applied to an automobile having a standard gear shift. The gear shift and other parts of such automobile are shown in more or less conventional form.

In the drawings the carburetor, designated generally by 20 (Fig. 1), is connected to the intake manifold 21 and in the manifold circuit is the usual butterfly valve or throttle 22 for regulating the fuel consumption and speed of the engine. This throttle valve is shown as connected through the usual linkage designated generally as 23, to a foot operated accelerator 24. The ordinary connections to a throttle control on the steering column may, of course, also be used.

The automobile shown also has a gear shift lever 25 and gear shift mechanism including the usual high speed slip rod 26. The mechanism controlled by the gear shift lever is so well known as to need no detailed description.

In addition to the throttle mechanism and the gear shift, the automobile to which the improvements are shown applied also has the usual choke button 27 on the instrument board 28 and this button is connected through the bell crank 29 and link 30 to an arm 31 for turning the choke valve 32 to shut off air at the intake 33 so as to increase the draft through the carburetor.

The air control mechanism of this invention is, in the present instance, controlled from the throttle, the gear shift and the choke.

The ideas involved in the present invention may be embodied in a plurality of valves and suitable control connections or in a single valve with corresponding changes in the controls. The former, that is, the multiple valve idea, will be the first described.

Figure 3:
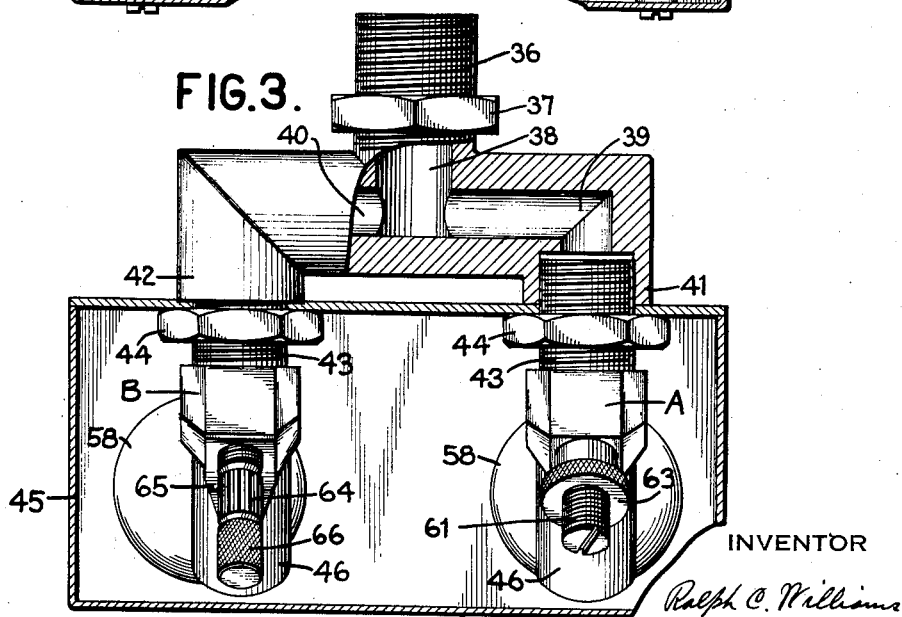
Fig. 3 is a section on line 3—3 of Fig. 2.

The multiple valve construction comprises a Siamese elbow having a threaded neck 36 which screws into a threaded opening in the intake manifold above the carburetor and the throttle valve. On the threaded neck 36 is a lock nut 37 which may be used to fasten the device in position to prevent turning after it is attached to the manifold. The threaded neck 36 encloses an air passage 38 connecting with branches 39 and 40, (Fig. 3). These air passages continue into portions 41 and 42 of the Siamese elbow and concentric with the air passages are threaded interiors to receive threaded necks 43 which are preferably integral with the air valves hereinafter described in detail. Each of these threaded necks is provided with a lock nut 44 which clamps in position one wall of a casing 45, which casing surrounds the valve mechanism, and at the same time serves to lock the valve mechanism against accidental turning on the manifold after it has been placed in position.

The necks 43 extend horizontally when in position on the manifold and integral with the necks are sleeve 46 which extend downward at an angle of about 45°. The sleeves 46 have cylindrical interiors and are provided with openings 47 and 48. These openings serve as air intake ports and, in addition to that function, the opening 47 has another purpose which will be stated later on.

Slidably and rotatably mounted in the sleeves 46 are cylindrical valve members 49 which have their ends 50 shaped to cooperate with adjacent circumferential shoulders within the sleeves 46 to control the flow of air into the passages 38, 39, and 40. Movement of the members 49 away from the shoulders will, of course, enlarge the passages for air and movements toward the shoulder will reduce or shut off the air supply.

In the dual valve construction the right hand valve, Fig. 2, is normally open, but the air passage can be reduced or shut off by operation of the choke 27 and the richness of the fuel mixture increased. The left hand valve of Fig. 2 is connected to the throttle and gear shift and might be referred to as the high speed valve. For convenience of reference the right hand valve is designated generally as valve A and the left hand valve as valve B.

The undersides of the sleeves 46 of both the valves A and B are provided with cam slots 55 arranged at an angle of substantially 45° to the longitudinal axis of the sleeves 46. Each of the valve members 49 is provided with a cylindrical bore at an angle of substantially 45° to the axis of the valve member, the upper ends of the openings being widened or counterbored to accommodate heads 56 on rods 57 inserted in the cylindrical openings and passing through the cam slots 55. The lower ends of these rods carry weights 58. These weights are held on the rods by cotter pins 59 extending through holes 60 in the rods. A number of such holes are provided in each rod so that the weights may be held at different points along the rod.

The weights 58 are capable under certain conditions of swinging the rods 57 with a sort of pendulum effect and this swinging movement of the rods will, because of the shape of the cam slots 55 surrounding the rods, give to and fro endwise movement of the valve members 49 within the sleeve portions 46 and carry the ends 50 away from or toward the cooperating circumferential shoulders, the direction of movement of the valve members depending upon the direction of movement of the weights. This movement of the valve members controls the flow of air through the valves.

The valve A has a threaded portion near its elbow to receive a threaded plunger 61 provided with a rounded end 62. The plunger 61 may be turned in or out to regulate the flow of air through the air passage of the valve and then fastened in position by a lock nut 63. The valve B may have a corresponding regulating plunger 61 with a ribbed portion 64 cooperating with a retaining spring 65 and a knurled portion 66 for turning the plunger to regulate the flow of air through the air passage. It is preferred, however, to have the plunger 61 of the valve B connected with a beveled pinion 68 at its upper end (Fig. 11), this pinion meshing with a corresponding pinion 69 on a shaft 70 leading to the instrument board 28. The end of the shaft which extends through the instrument board is provided with a knob or button 71 integral with a disc 72 which may carry indicia cooperating with an indicating mark on the instrument board to show the position to which the plunger 61 has been adjusted. Details of this construction are shown in Fig. 12. The pinion 68 is integral with a sleeve 74 rotating in a bracket 75 and the sleeve has a slot 76 engaging a pin extending laterally from the periphery of a cylindrical extension of the plunger 61. It is clear that turning the button 71 will drive the plunger 61 in or out as desired, thereby affording a convenient way for the operator to adjust the plunger 61 from the instrument board to regulate the flow of air through the valve.

The valve A, which, as before stated, is connected to the choke 27, normally has its rod 57 in a substantially perpendicular position. In this position the rod 57 will, because of the cooperation of the rod with the slot 55, hold the valve member or plunger 49 retracted. In this retracted position the valve is open practically to its full extent because the shoulder 50 on the valve member will be at its greatest distance from the cooperating circumferential shoulder in the air passage. This retracted or normal position of the plunger 49 of the valve A is illustrated in Fig. 4.

The rod 57 of the B valve is normally held by devices connected to the throttle and gear shift, and hereinafter described, in a position which, because of the cooperation of the rod 57 with its associated cam slot 55, holds the valve member 49 in the B valve in its advanced position, thereby shutting off the flow of air through the valve. This advanced position is illustrated in Fig. 5. As shown in that figure the shoulder 50 of the valve member is seated against the associated circumferential shoulder and the flow of air is shut off. It may be stated in a general way here that when it is desired to open the B valve the devices which hold the valve closed are withdrawn or rendered ineffective and the weight 58 on that rod will then swing the rod and, because of the associated cam slot 55, retract the valve member 49 and thereby open the valve. The operation of the devices mentioned is explained in detail further on.

Figure 1:
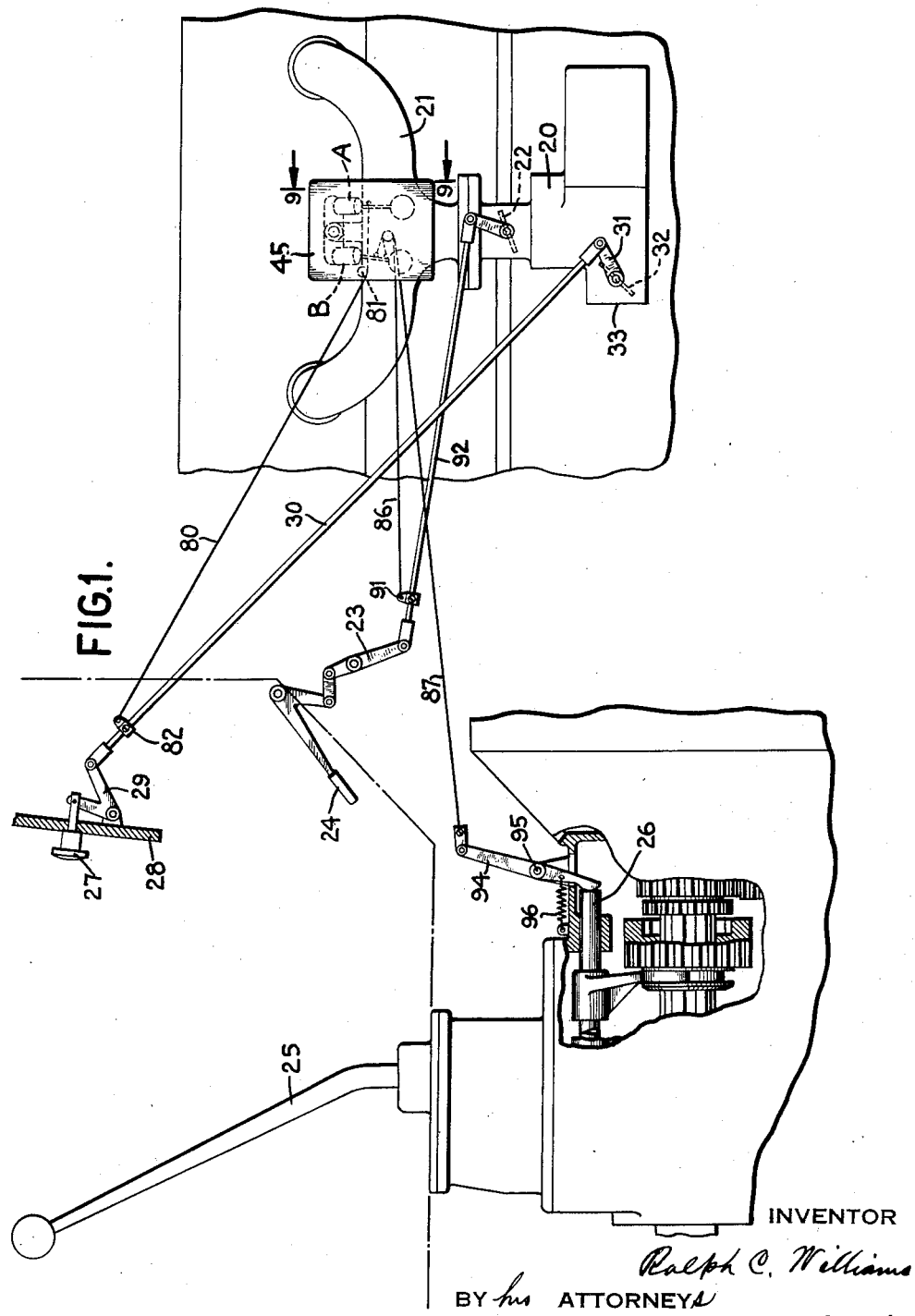
Fig. 1 is a more or less diagrammatic showing of the inventions as they would appear when applied to an automobile.

The devices for closing the A valve by operation of the choke are shown in Figs. 1, 2, and 10. They comprise a spring 78 secured to the rear wall of the casing 45 and extending to a position where the outer end is in light contact with the rod 57 of the A valve when that rod is in a vertical position. At an intermediate point the spring 78 is formed to provide an eye to receive the end of a cable 80 running over a guide roll 81 on the rear wall of the casing 45, the cable then extending up to a clamp 82 on the choke rod 30. When the choke button 27 is pulled out or away from the instrument board the cable 80 will flex the spring 78 and cause the spring to act against the rod 57 to swing the rod from its normal vertical position toward the left (Fig. 2), and, because of the cooperation of the cam slot 55 with the rod, move the valve member 49 in the A valve toward its closing position and thus either reducing or shutting off the supply of air according to the extent of movement of the valve member.

It will be apparent that if the automobile or other vehicle starts an upward climb as for instance up a hill, the weight 58 for the A valve will swing the rod 57 in the same direction as it is moved by flexing the spring 78 and that if the incline is steep enough the air will be entirely shut off by the advance of the valve member 49. This is because of the cooperation of the cam slot 55 with the rod 57.

In the present embodiment the B valve is controlled by both the throttle and the gear shift. The devices for doing this are also shown in Figs. 1, 2, and 10. They comprise two springs 84 and 85 secured to the rear wall of the casing or cover 45 for the valve mechanism and having their free ends extending past the rod 57 for the B valve. In the normal condition of the parts these free ends act against the rod 57 to hold the rod in its off position, that is, in the position shown in Fig. 2. In that position the valve member 49 in the B valve will be held in the position illustrated in Fig. 5. The springs 84 and 85 are both formed at points intermediate their lengths to provide eyes by which the ends of cables 86 and 87 may be attached. These cables run around pulleys 88 and 89 loose on a stud attached to the wall of the casing 45. The cable 86 extends toward the driver's seat and is secured to a clamp 91 on the rod 92 for transmitting movements from the accelerator 24 to the throttle valve 22. When the accelerator 24 is depressed far enough the cable 86 will draw its spring 84 to the right, Figs. 2 and 10, to withdraw the spring from the rod 57 of the B valve.

The cable 87 is connected at one end to the spring 85 and at its other end to the upper end of a lever 94 pivoted at 95 and having its lower end in the path of the high speed slip rod 26. A spring 96 tends at all times to hold the lever and connected parts in the positions shown. However, when the gear shift is operated to throw in the high speed gear, the slip rod 26 will engage the lower end of the lever 94 and rock the lever counter clockwise, Fig. 1, thereby drawing the cable around its pulley and drawing the spring 85 away from the rod 57 of the B valve. When the springs 84 and 85 are both pulled away from their normal positions, the rod 57 is freed from restraint and the weight 58 will cause the rod to move substantially to a vertical position. This movement to the vertical position will, because of the cam slot 55 in the sleeve 46 of the B valve, cause the valve member 49 in that valve to be retracted and thereby open the air passages through that valve.

From the foregoing it is clear that when the gears are shifted to high the high gear slip rod will act through the connections described to move the spring 85 immediately the full distance to free the rod 57 of the B valve. The movement of the accelerator is a gradual one and the spring 84 is gradually flexed to release the rod 57 as the accelerator is depressed. It is preferred to so arrange the connections that the accelerator will not act on the spring until a certain ground speed, e. g., 20–30 miles per hour, has been attained. This may readily be effected by a little slack in the cable or by any other suitable means.

It is also clear that the accelerator may be used while the gears are set for the lower speeds without allowing the B valve to open, as while the gears are set for the lower speeds the high speed slip rod will be in its retracted position and the spring 85 will therefore be left in its normal position. In that normal position it acts on the rod 57 to hold the B valve closed.

When the springs 84 and 85 are held in their retracted or ineffective positions the pendulum effect supplied by the weight 58 will swing the rod 57 and operate the connected valve member to reduce or shut off the supply of air if the vehicle starts on an upward climb. If the incline is steep enough the air will be completely shut off. The B valve therefore acts in this respect the same as the A valve. It is apparent that regardless of the mechanism connected to the engine and speed controls the two valves will operate automatically to shut off the air in case full draft created by the engine is needed to draw fuel to the engine when maximum power is required on a steep incline.

The form of the apparatus shown in Fig. 9 consolidates in a single valve the features and advantages of the multiple valve idea. In this form it is preferred to connect the valve air passages with the top of the manifold by an elbow member 101. A sleeve 102 is threaded into the horizontal part of the elbow member and is secured in position by a lock nut 103.

A threaded neck 104 of the valve is screwed into the interior of the sleeve 102 and passes through the rear wall 45 of the casing enclosing the mechanism. A lock nut 105 prevents accidental movement of the valve and holds the casing in position. A spacer stud 106 between the manifold and the rear wall of the casing holds the lower part of the casing against vibration.

In this construction the spring 78 connected to the choke and the springs 84 and 85 connected respectively to the accelerator and the gear shift all cooperate with the rod 57 of the single valve. The springs 84 and 85 normally hold the rod in such a position that the valve is partially closed while the spring 78 is so placed that it will normally be contacted with by the rod 57 only when that rod is in vertical position. If the springs 84 and 85 are moved to their ineffective positions, that is, the positions in which they release the rod 57, the rod will swing to its vertical position and fully open the valve. On the other hand operation of the choke will pull its spring 78 against the rod 57 and will therefore partially or entirely shut off the supply of air through the valve, depending upon the extent of movement of the choke.

The single valve mechanism is illustrated in Fig. 9 as having a plunger 107 which may be adjusted in or out to regulate the air flow in the same manner as described in connection with the plungers 61 and 64 of the A and B valves. A lock nut 108 may be used to lock the plunger in adjusted positions. It is to be understood, however, that the mechanism shown in Figs. 11 and 12 may be applied to the single valve so that the regulating plunger 107 may be turned directly from the instrument board of the vehicle.

As stated above, in the single valve embodiment of the invention the springs 84 and 85 are so positioned that they hold the valve in a partially closed condition. It is preferred to have the control connection so adjusted that shifting to high gear will immediately withdraw its spring 85 to a fully ineffective position, and to so adjust the spring 84 and its control connections that the spring 84 will not begin to be withdrawn from its normal position until a ground speed of, for example, 20–30 miles per hour, is attained. It is obvious that the mechanism is capable of adjustment so that the valve will be called into play at the start or at various ground speeds according to the characteristics and uses of different vehicles. Above that speed the valve will be proportionately opened as the throttle opening is increased, i. e. as the speed of the vehicle increases. Until that speed of 20–30 miles per hour is reached the valve is held partially closed, thereby preventing excess dilution of the air or fuel supply at low speeds.

As will have been noted, the openings 47 in the sleeves 46 are elongated. This is to give more air capacity, but, at the same time, it aids in the assembly and disassembly of the valve. In assembling the valve members 49 are inserted through the open ends of the sleeves 46 and the rods 57 then inserted through the openings 47, the cylindrical bores in the members 49 and the cam slots 55. The rods are then pulled down to draw the heads 56 on the rods into the counter sunk recesses in the members 49 and the weights attached to the rods by means of cotter pins 59 inserted through the proper holes 60 in the rods. To disassemble the operations just stated are simply reversed.

While in applying the inventions to an automobile it is preferred to use all of the controls and connections described in connection with the air valves, it is obvious that they can be used singly or in various combinations in which one of the controls or connections is omitted. For example, the mechanism shown in Figs. 11 and 12 might be used alone or in combination only with the throttle control of the valve, or the choke and throttle controls only employed. Other combinations which will give useful results are apparent.

The casing 45 over the mechanism is substantially dust proof and it is, therefore, provided with a screen 110 which will exclude dust and dirt and, at the same time, allow the air to enter.

The air is drawn through the valves at a high velocity and there is a tendency toward a vacuum above the ends of the plungers 49 in the valves. This has a valuable effect on the mechanism, as it exerts a sort of suction on the plungers which will, to a certain extent, counteract the effects of the weights 58 and permit movements of the rods 57 without undue friction and wear against the lower edges of the cam slots 55.

The 45° inclination of the sleeves 46 and the angle of the cam slots 55 with respect to the longitudinal axes of the sleeves have the effect of preventing uncontrolled swinging of the weighted rods 57 when the rods are relieved from the control of the springs 78, 84, and 85. This prevents irregular operation of the valves and resulting irregularity of the engine and is considered a valuable feature in the construction.

It should also be pointed out that the openings or ports 47 and 48 in the sleeves 46 are preferably somewhat larger than is required for the necessary air capacity. This is to provide exits for the gases resulting from backfire. The openings, particularly the opening 48, also allow to a certain extent the escape of particles of dirt or other foreign matter from the interiors of the valves.

While the A valve has been shown and described as being normally open, it is obvious that the mechanism can be so arranged that the A valve normally is less than half open. When this arrangement is used it is advisable to so position the spring 78 that the weight 58 and the rod 57 can swing to fully open or close the valve. This arrangement is preferable under certain conditions, as there is less likelihood of interference with idling of the engine and the valve is more fully controlled by movements of the vehicle without, however, preventing fully closing the valve when the choke must be used.

In describing above the illustrative embodiments of the invention it has been necessary also to describe in detail the way the various parts operate. It is, therefore, thought to be unnecessary to re-state the operation here. It may be said, however, that the system is a highly flexible one adaptable to various applications and conditions of operation; and without imposing any handicaps on the operation of the engine or the vehicle driven by it.

The benefits derived from the invention are numerous, but they are mostly centered around the fact that more complete combustion of the fuel is obtained. This prevents waste of fuel and the resulting formation of carbon and dilution of oil in the engine. If no other advantages were obtained, the ones just stated are highly desirable ones. However, other and numerous advantages will be apparent to those skilled in the art when the apparatus is used as a whole or in its various parts in present and other embodiments of the idea.

While the constructions shown and described are well adapted to fulfill the objects and purposes primarily stated, it is, as previously stated, apparent that many variations of combinations and changes in construction may be made, all of which will be apparent to those skilled in the art. It is, therefore, the desire not to be limited in any way except by such limitations as may be contained in the following claims.

What is claimed is:

1. In apparatus of the character described comprising a pair of structurally separate air inlet valves each containing an air passage communicating with the intake manifold above the carburetor, one of said valves normally being open and the other normally closed, and means under the control of the operator for closing the normally open valve and for opening the normally closed valve as desired.

2. In a vehicle driven by an internal combustion engine, a plurality of air inlet valves in the wall of the intake manifold of the engine, one of which valves is normally closed and the other normally open, means under the control of the vehicle operator for opening and closing said valves, and weights connected to operate said valves by a change in the longitudinal inclination of the vehicle.

3. In apparatus of the character described, the combination with the control mechanism for regulating the operation of an internal combustion engine and the ground speed of a vehicle, of a plurality of structurally separate auxiliary air inlet valves for admitting air between the carburetor and the engine, devices connected to the aforesaid control mechanism for automatically regulating the flow of air through said valves as an incident to regulating the operation of the engine and the ground speed of the vehicle, and a weight connected to each of the valves and acting to control said valves by a change in the longitudinal inclination of the vehicle.

4. In apparatus of the character described comprising a plurality of air inlet valves through the wall of the intake manifold, one of said valves being normally open and the other normally closed, means under the control of the operator for closing the normally open valve and for opening the normally closed valve as desired, and means automatically closing the normally open valve by a change in the longitudinal inclination of the vehicle.

5. In an apparatus of the character described, the combination with the control mechanism for regulating the operation of the engine and the ground speed of the vehicle, of a plurality of auxiliary air inlet valves for admitting air between the carburetor and the engine, devices automatically operable as an incident to controlling the starting and speed of the engine and the ground speed of the vehicle for opening and closing said valves, and devices automatically operated by a change in the inclination of the vehicle for controlling the flow of air through said valves.

6. A vehicle driven by an internal combustion engine and having an instrument board, a plurality of air inlet valves in the wall of the intake manifold of the engine, one of which valves is normally open and the other normally closed, means under the control of the vehicle operator for opening and closing said valves, and means comprising a manually operable device on the instrument board for regulating the flow of air through one of said valves independently of the means for opening and closing the valves.

7. In an apparatus of the character described, the combination with an internal combustion engine, of two auxiliary structurally separate air inlet valves, devices for controlling the fuel supply to the engine and for controlling the ground speed of the vehicle, a choke and means for operating it, and connections for controlling the valves by adjustments of the choke and control devices.

8. In an automobile having an internal combustion engine, a choke, a throttle and a gear shift, a plurality of structurally separate auxiliary inlet valves for admitting air to the fuel supply for the engine, and connections to the choke, gear shift and throttle for controlling the operations of said valves.

9. In an automobile having an internal combustion engine, a choke, a throttle, a gear shift and an instrument board, a plurality of auxiliary inlet valves for admitting air between the carburetor and the engine to increase the amount of air in the fuel stream, connections to the choke, gear shift and throttle for controlling the operations of said valves, and devices comprising a manually operable device on the instrument board for regulating the flow of air through one of said valves independently of the aforesaid connections.

10. In an apparatus of the character described, an engine having a carburetor and an air inlet valve in the manifold between the carburetor and the engine, a throttle and a gear shift, and means comprising; connections to the throttle and the gear shift for controlling the opening and closing of the air inlet valve and devices operating to close the valve by a change in the longitudinal inclination of the engine.

11. In a valve construction for the purpose described, a sleeve at an angle of approximately 45° to horizontal and having a cam slot in its lower wall disposed at an angle of approximately 45° to the axis of the sleeve, a valve member movable in the sleeve, a rod secured in the valve member and extending through the cam slot, and a weight attached to the lower end of the rod.

12. In a valve of the character described, a sleeve at an angle of 45° to horizontal and having an elongated opening at its top and a cam slot in its bottom disposed at an angle of 45° to the longitudinal axis of the sleeve, a valve member movable endwise in said sleeve and containing a cylindrical bore counter bored at the top, a rod constructed to be inserted through the top opening in the sleeve and the cam slot in the sleeve, said rod having a head on its upper end to engage the counter bored portion in the valve member, and a weight attached to the lower end of the rod.

13. In an automobile having an engine and an intake device for a fuel mixture, an auxiliary air intake valve for admitting additional air to the mixture in said device, said valve comprising a movable member for regulating the flow of air through the valve and means comprising a weight for operating the member by gravitational movements of the weight, a throttle and a gear shift, and devices controlled by the throttle and the gear shift for controlling movements of the weight and thereby the valve member.

14. In an automobile having an internal combustion engine, a carburetor and a manifold; an auxiliary air inlet valve for admitting air to the current drawn through the carburetor and manifold by the engine, said valve comprising a member which is movable to regulate the flow of air through the valve, means comprising a weight rigid with said member for operating the member by movements of the automobile, a gear shift, a throttle, a choke, and devices connected to the gear shift, the throttle and the choke for controlling movements of the weight and its connected valve member.

15. In an automobile having an internal combustion engine, a carburetor and a manifold; an auxiliary air inlet valve for admitting air to the stream drawn through the carburetor and manifold by the engine, said valve comprising a member movable to regulate the flow of air through the valve, devices comprising a weight connected to said member in such a way as to operate said member by movements of the automobile, a choke, and devices whereby the movable valve member may be moved by the choke against the influence of the weight.

16. In an automobile having an internal combustion engine, a carburetor and a manifold; an auxiliary air inlet valve for admitting air to the stream drawn through the carburetor and manifold by the engine, said valve comprising a member movable to regulate the flow of air through the valve, devices comprising a weight depending from the movable member for moving said member by movements of the automobile, a throttle, a choke, and devices requiring movements of the throttle and the choke for adjusting the movable valve member by movements of the weight independently of movements of the automobile.

17. In a vehicle driven by an internal combustion engine and having a throttle for controlling the fuel supply to the engine, means for admitting an auxiliary air supply into the intake manifold of the engine comprising devices whereby changes in the longitudinal inclination of the vehicle automatically control the flow of air through said air admitting means proportional to the changes in inclination, and devices connected to the throttle and acting upon the automatic means for controlling operation of said automatic means.

18. In a vehicle driven by an internal combustion engine and having a throttle and a choke, means for admitting an auxiliary air supply into the intake manifold of the engine comprising devices whereby changes in the longitudinal inclination of the vehicle automatically regulate or shut off the flow of air through the admitting means depending upon the degree of inclination, and devices connected to the throttle and choke for controlling the automatic means.

19. In a vehicle driven by an internal combustion engine and having a throttle, a choke and a gear shift, means for admitting an auxiliary air supply into the intake manifold of the engine comprising means whereby changes in the longitudinal inclination of the vehicle automatically regulate the air flow through the admitting means, and devices connected to the throttle, the choke and the gear shift for controlling the automatic means.

20. In a vehicle driven by an internal combustion engine and having a throttle, a choke and a gear shift, devices for admitting an auxiliary air supply into the intake manifold of the engine comprising means whereby changes in the inclination of the vehicle automatically regulate the air flow through said air admitting means, devices connected to the throttle, the choke and the gear shift for controlling the automatic means, and a device adjustable independently of the throttle, choke and gear shift for regulating the amount of air admissible through the auxiliary air admitting means.

21. In a vehicle driven by an internal combustion engine and having a throttle and a choke, an air inlet valve in the wall of the intake manifold of the engine, said valve comprising a single member which is movable to regulate the flow of air through the valve and into the manifold, means comprising a weight connected to said member for imparting flow regulating movements to the member, and connections to the throttle and choke for controlling movements of the weight.

22. In a vehicle driven by an internal combustion engine and having a throttle and a choke, an air inlet valve in the wall of the intake manifold of the engine, said valve comprising a sleeve and a member movable in the sleeve to control the flow of air into the intake manifold, a rod connected to the movable member and extending through a cam slot in the valve sleeve, a weight on the rod acting to swing the rod and cooperating with the cam slot to shift the movable valve member, and devices connected to the throttle and choke for moving the rod and thereby the movable valve member against the influence of the weight to control the air flow.

23. In a vehicle driven by an internal combustion engine and having a throttle and choke, an air inlet valve in the wall of the intake manifold of the engine, said valve comprising a sleeve provided with a cam slot and a member movable in the sleeve to control the flow of air into the intake manifold, a rod connected to the movable member and acting through the cam slot to shift the movable valve member to regulate the air flow, a weight connected to the rod acting to swing the rod and cooperating with the cam slot to shift the movable member, devices connected to the throttle and choke for moving the rod and thereby the movable valve against the influence of the weight to control the air flow, and devices adjustable independently of the movable valve member to regulate the amount of air admissible through the air inlet valve.

RALPH C. WILLIAMS.